United States Patent [19]
Lafon

[11] 3,742,031
[45] June 26, 1973

[54] NOVEL NORMOLIPEMIANT AGENTS
[75] Inventor: Louis Lafon, Paris, France
[73] Assignee: Societe Anonyme dite: Orsymonde, Paris, France
[22] Filed: Aug. 3, 1970
[21] Appl. No.: 60,730

[30] Foreign Application Priority Data
Aug. 8, 1969 Great Britain.................. 39,892/69

[52] U.S. Cl.... 260/481 R, 260/465.8 R, 260/537 S, 260/561 S, 424/311, 424/317, 424/320
[51] Int. Cl.......................................... C07c 149/20
[58] Field of Search................ 424/304; 260/481 R, 260/537 S

[56] References Cited
UNITED STATES PATENTS
3,466,323   9/1969   Tholstrup........................... 260/481

OTHER PUBLICATIONS
March, Advanced Org. Chem., p. 328, QD251M2

Luttrinhaus et al., "Justus Liebigs Ann Der Chemie." Bd. 624 (1959), p. 79–97, QD1L7

Primary Examiner—Lorraine A. Weinberger
Assistant Examiner—John F. Terapane
Attorney—Jacobs & Jacobs

[57]          ABSTRACT

They are constituted by compounds of the formula:

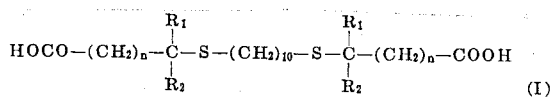

$$HOCO-(CH_2)_n-\underset{R_2}{\overset{R_1}{C}}-S-(CH_2)_{10}-S-\underset{R_2}{\overset{R_1}{C}}-(CH_2)_n-COOH \quad (I)$$

in which $R_1$ and $R_2$ are the same or different and each represents a hydrogen atom or an alkyl radical having one or two carbon atoms, and $n$ is 0, 1 or 2, as well as their ester, amide and nitrile derivatives and their nontoxic salts.

4 Claims, No Drawings

NOVEL NORMOLIPEMIANT AGENTS

The present invention relates to novel 1,10-[bis-(carboxy-alkylene-thio)]-decanes corresponding to the following general formula:

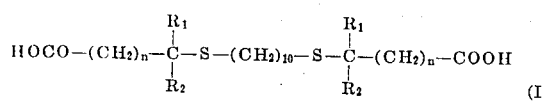
(I)

in which $R_1$ and $R_2$ are the same or different and each represents a hydrogen atom or an alkyl radical having one or two carbon atoms, and $n$ is 0, 1 or 2, as well as their ester, amide and nitrile derivatives and their non-toxic salts.

The novel compounds in particular have an action on the lipide metabolism and are therefore capable of being utilised as normolipemiant agents, for treating diseases where the causes and symptoms appear to be connected with a disturbance in the metabolism, for example arteriosclerosis and coronary artery disorders.

Pharmaceutical compositions, prepared by incorporating one or more of the compounds of the invention in pharmaceutically acceptable diluents, can be administered to patients in a form suitable for providing an immediate or a delayed effect by oral or parenteral administration.

The daily doses proposed for therapeutic usage range from 0.5 to 5 g, depending upon the compound utilised and the method of administration.

Pharmaceutical compositions can also include, in addition to the products of the invention, one or more other medicaments, having an action on lipide metabolism or on vascular disorders which is well known, such as vitamins, choline, inositol and amino acids.

The compounds according to the invention can be prepared by reacting the 1,10-dithiol-decane with two molecular equivalents of a compound of the formula:

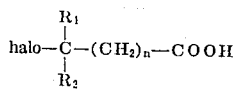

(or an ester derivative or a nitrile of the latter), in an ethanolic reaction medium in the presence of aqueous caustic soda.

The compounds can also be obtained by reacting a 1,10-dihalo-decane with two molecular equivalents of the compound of the formula:

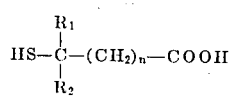

(or a derivative of the latter) in an ethanolic medium in the presence of aqueous caustic soda.

Starting from the compounds of the Formula I, the corresponding amide derivatives can be prepared in the conventional manner.

The invention is illustrated by the following non-limitative examples.

EXAMPLE 1

1,10-[bis-(cyanotrimethylenethio)]-decane.

20.65 g (0.10 mole) of 1,10-dithiol-decane, 22.8 g (0.22 mole) of 4-chloro-butyronitrile and 100 of ethanol were introduced into a 250 ml flask. Then 22 ml of a 40 percent aqueous caustic soda solution was slowly added and the reaction mixture was allowed to stand for three hours. The solvent was eliminated under reduced pressure and the residue was then taken up in water and the 1,10-[bis-(cyanotrimethylenethio)]-decane thus formed was extracted with ethyl ether. The ethereal solution was washed with water, dried over anhydrous calcium chloride, filtered and evaporated.

The product, obtained in a yield of 92.6 percent (31.5 g), has the form of a white yellow-reflecting crystalline powder, the melting point of which is 30°–31°C. and it is soluble in ethanol, ethyl ether and benzene and insoluble in water.

EXAMPLE 2

(Decane-1,10-dithio)-diacetic acid.

$HOCO-CH_2-S-CH_2-(CH_2)_8-CH_2-S-CH_2-COOH$ 30 g (0.10 mole) of 1,10-dibromo-decane, 18.5 g (0.19 mole) of thioglycolic acid and 100 ml of ethanol were introduced into a 500 ml flask. Then 40 ml of a 40 percent aqueous solution of caustic soda was slowly added. A thick white precipitate appeared and the temperature rose to boiling, which was then maintained for 1 hour. The reaction mixture was allowed to cool, taken up in water and the ethanol was evaporated under reduced pressure. The residue was taken up in water and in ethyl ether. The aqueous solution was then acidified by the addition of hydrochloric acid. The crude (1,10-dithio-decane)-diacetic acid which precipitated was purified by crystallisation from a mixture of water and ethanol.

The product, obtained in a yield of 77 percent (24.8 g), has the form of a white powder with an instantaneous melting point of 127°C. and it is soluble in aqueous alkaline solutions and in ethanol and is insoluble in water, ethyl ether and benzene.

EXAMPLE 3

1,10-[bis-(1-carboxy-ethylthio)]-decane (or (decane-1,10-dithio)-dipropionic acid).

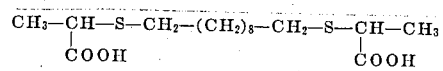

30 g (0.10 mole) of 1,10-dibromo-decane, 23.3 g (0.22 mole) of thiolactic acid and 100 ml of ethanol were introduced into a 250 ml flask. 44 ml of a 40 percent solution of caustic soda was then slowly added. The temperature rose to the boiling point, where the mixture was then maintained for 1 hour. The solvent was evaporated under reduced pressure and the residue was taken up in water. It was then acidified by the addition of hydrochloric acid. The crude 1,10-[bis-(1-carboxyethylthio)]-decane which precipitated was recovered by filtration and then purified by crystallisation from acetonitrile.

The product, obtained in a yield of 58.6 percent (20.5 g), has the form of a white crystalline powder, the instantaneous melting point of which was around 100°C., and it is soluble in aqueous alkaline solutions, ethanol and ethyl ether and insoluble in water and benzene.

EXAMPLE 4

(Decane-1,10-dithio)-diethyl-di-isobutyrate.

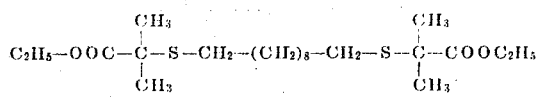

39 g (0.20 mole) of ethyl-bromoisobutyrate, 10.3 g (0.10 mole) of 1,10-dethiol-decane, 20 ml of 40 percent aqueous caustic soda solution and 100 ml of ethanol were introduced into a 250 ml flask. The reaction mixture was heated to the boiling point and then maintained there for 1 hour. The solvent was then evaporated under reduced pressure. The crude (1,10-dithiodecane)-diethyl-diisobutyrate thus isolated was purified by fractional distillation; the fraction passing over from 145°–155°C. under a pressure of 0.7 mm Hg was recovered.

The product, obtained in a yield of 31 percent (13.4 g), has the form of a colourless oil which was soluble in ethanol, ethyl ether and benzene and insoluble in water.

EXAMPLE 5

1,10-[bis-(carbamoyltrimethylene-thio)]-decane (or (decane-1,10-dithio)-dibutyramide).

$H_2NOC-(CH_2)_3-S-CH_2-(CH_2)_8-CH_2-S-(CH_2)_3-CONH_2$ 17 g (0.05 mole) of 1,10-[bis-(cyanotrimethylene thio)]-decane prepared as in Example 1 and 80 ml of ethanol were introduced into a 250 ml flask. Then 6 ml of a 6.0 N aqueous solution of caustic soda was slowly added and then 20 ml of 40 volume hydrogen peroxide was slowly added. The temperature rose to 50°C. and there was a regular evolution of gas. The reaction mixture was agitated for about 15 hours and then filtered.

The product, obtained in a yield of 85.2 percent (16 g), has the form of a white crystalline powder, the instantaneous melting point of which is 179°–180°C.; it is insoluble in water, ethanol, ethyl ether and benzene.

I claim:

1. A 1,10-[bis(carboxyalkylenethio)]-decane of the formula:

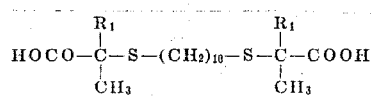

wherein $R_1$ is hydrogen or alkyl of one or two carbon atoms, and the nontoxic salts and lower alkyl esters thereof.

2. A compound according to claim 1 wherein $R_1$ is hydrogen or methyl.

3. 1,10-[Bis-(1-carboxy-ethylthio)]-decane.

4. (Decane-1,10-dithio)-diethyl-di-isobutyrate.

* * * * *